United States Patent [19]

Neyman et al.

[11] Patent Number: 6,005,931
[45] Date of Patent: Dec. 21, 1999

[54] NEGOTIATED ROUTING IN TELEPHONY SYSTEMS

[75] Inventors: Igor Neyman, Palo Alto; Alec Miloslavsky, San Carlos, both of Calif.

[73] Assignee: Genesys Telecommunications Laboratories, Inc., San Francisco, Calif.

[21] Appl. No.: 08/968,825

[22] Filed: Nov. 14, 1997

Related U.S. Application Data

[63] Continuation-in-part of application No. 08/869,815, Jun. 5, 1997, which is a continuation-in-part of application No. 08/802,667, Feb. 19, 1997, which is a continuation-in-part of application No. 08/797,420, Feb. 10, 1997.

[51] Int. Cl.$^6$ ............. H04M 7/00; H04M 3/00; H04M 3/42; H04Q 3/64
[52] U.S. Cl. ............ 379/220; 379/207; 379/230; 379/233; 379/265; 379/309
[58] Field of Search .................. 379/207, 219, 379/220, 230, 231, 232, 233, 265, 266, 309

[56] References Cited

U.S. PATENT DOCUMENTS 5,784,451  7/1998  Smith, Jr. ............... 379/309 X
5,915,008  6/1999  Dulman ................... 379/220 X

*Primary Examiner*—Harry S. Hong
*Attorney, Agent, or Firm*—Donald R. Boys

[57] ABSTRACT

A telephone call distribution system for determining destination for an incoming telephone call in a telephony network including a service control point (SCP) operates with a plurality of workstations each comprising a telephone coupled to the telephony network and a proximate computer station having a video display unit (PC/VDU), the PC/VDU connected to the SCP via a wide area network (WAN), and a personal router associated with each PC/VDU. The SCP broadcasts data pertaining to the incoming telephone call and a request for a destination to individual ones of the PC/VDUs via the WAN, and the personal routers negotiate a destination based on individual routing rules and the data pertaining to the call. At least one of the individual routers responds to the SCP with a destination for the call. In some instances the workstations are associated with a call center, and the call center may be CTI-enhanced. Individual routers in this instance may be executed on a server on a local area network connecting workstations at the call center, the server providing individual routers to workstations in a client-server relationship.

12 Claims, 4 Drawing Sheets

Sample User Interface Screen

Sample of broadcast announcement record

Sample User Interface Screen

NEGOTIATED ROUTING IN TELEPHONY SYSTEMS

CROSS REFERENCE TO RELATED DOCUMENT

The present application is a Continuation-In-Part of prior copending patent application Ser. No. 08/869,815, filed Jun. 5, 1997, is a continuation-in-part of application Ser. No. 08/802,667, filed Feb. 19, 1997 which is a continuation in part of copending patent application Ser. No. 08/797,420, filed Feb. 10, 1997.

FIELD OF THE INVENTION

The present invention is in the area of telephone call processing and switching, and pertains more particularly to intelligent call-routing systems, and equipment and methods for customizing and Personalizing Routing Rules and Protocol.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point-of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There are, at the time of the present patent application a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

In current art, although there are widely varying systems in the art relative to routing rules, all such systems exhibit a common drawback. Typically such systems, once set up (programmed) to follow certain routing rules and practices, cannot easily vary, and individual users or groups of users, cannot change the rules arbitrarily. To tinker with the routing rules in CPE typically requires a highly-trained maintenance technician (system administrator).

What is clearly needed is method and apparatus which allows an individual user of a routing system, or a group of users, to alter and customize the routing rules of the system for particular purposes, which may change from time to time, depending on the users.

SUMMARY OF THE INVENTION

In a preferred embodiment of the present invention a method for determining a destination for an incoming telephone call received in a telephony network having a service control point (SCP) to one of a plurality of workstations each having a telephone and a computer station with a video display unit (PC/VDU) proximate the telephone, the PC/VDUs each connected to the SCP via a wide area network (WAN) is provided, the method comprising steps of (a) implementing a personal router at each PC/VDU wherein individual users determine personal routing rules for the associated workstation; (b) sending data pertaining to an incoming telephone call and a request for a destination from the SCP to individual ones of the plurality of workstations via the WAN; (c) negotiating a final destination for the incoming telephone call among the individual ones of the plurality of personal routers; and (d) sending a response to the SCP via the WAN, the response including a final destination for the telephone call determined as a result of the negotiation.

A further step sends the telephone call to the final destination by the SCP directing the network where to send the call as a result of the response in step (d) above. In some embodiments, groups of workstations are organized in call centers, each call center having a telephony switch to which individual telephones are connected with PC/VDUs proximate the telephones, and the PC/VDUs are interconnected via a local area network, a processor also connected on the local area network providing connection to the SCP via the WAN, and, in step (b) data pertaining to a telephone call and a request for a destination is sent to individual personal routers via the WAN and the LAN, and in step (c) negotiation is via the LAN and the WAN.

In some cases personal routers are executed on a server connected to the LAN in a client-server relationship with the workstations, and in some embodiments the client-server router executes on the telephony switch, which may be a processor connected to the telephony switch by a CTI connection, and the processor is connected to the LAN.

In another aspect of the invention a telephone call distribution system for determining destination for an incoming telephone call in a telephony network including a service control point (SCP) is provided, comprising a plurality of workstations each comprising a telephone coupled to the telephony network and a proximate computer station having a video display unit (PC/VDU), the PC/VDU connected to the SCP via a wide area network (WAN); and a personal router associated with each PC/VDU. The SCP broadcasts data pertaining to the incoming telephone call and a request for a destination to individual ones of the PC/VDUs via the WAN, and the personal routers negotiate a destination based on individual routing rules and the data pertaining to the call, and at least one of the individual routers responds to the SCP with a destination for the call.

In a further action the SCP directs the incoming telephone call to the destination returned by at least one of the personal routers. In some embodiments, in the plurality of workstations, groups of workstations are organized in call centers, each call center having a telephony switch to which individual telephones are connected with the PC/VDUs proximate the telephones, and the PC/VDUs are interconnected via a local area network, a processor also connected on the local area network providing connection to the SCP via the WAN. Personal routers may be executed on a server connected to the LAN in a client-server relationship with the workstations, and in many embodiments the call-centers embody a CTI-enhanced telephony switch.

The apparatus and methods of the invention as disclosed in enabling detail below provide a simplified and efficient method for determining destination for incoming calls to a telephony network in a manner that is both novel and solves existing difficulties in network call routing.

BRIEF DESCRIPTION OF THE DRAWING FIGURES

DESCRIPTION OF THE PREFERRED EMBODIMENTS

Figure 1:
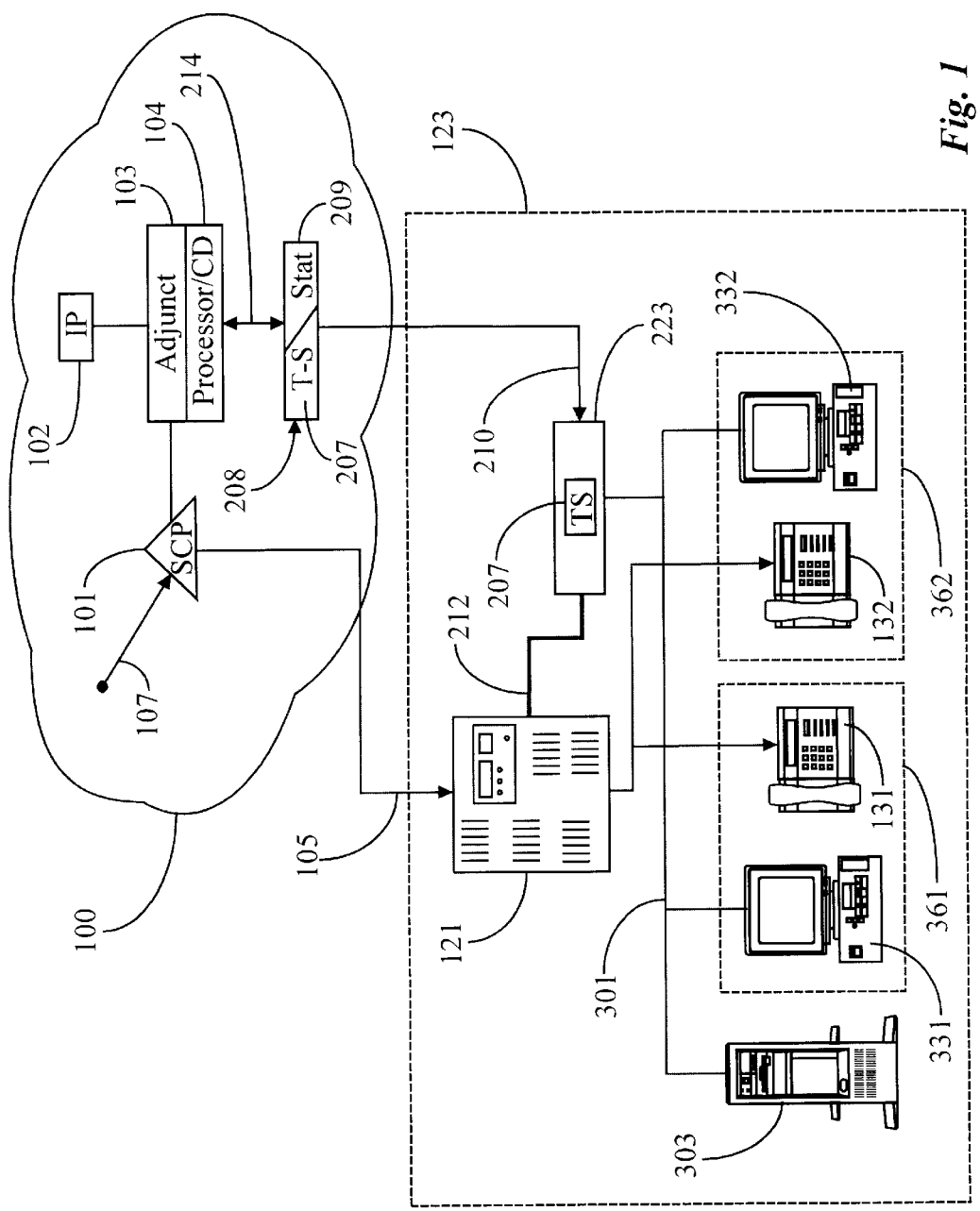
FIG. 1 is a system diagram of a call-routing system in an embodiment of the present invention.

FIG. 1 is a system diagram of a call-routing system according to a preferred embodiment of the present invention. Dotted lines 123 enclose elements of the system native to a customer's premises (CPE). This equipment in a preferred embodiment comprises a computerized telephony central switch 121 connected by a data link 212 to a processor 223 running an instance of a unique telephony server (T-Server) T-S 207. Switch 121 in conventional art distributes incoming calls (on line 105) to connected telephones, such as telephone 131 at a workstation 361 and telephone 132 at a second workstation 362. In various embodiments of the present invention T-Server 207 running on processor 223 exerts controlling influence on routing of incoming calls, as is described in further detail below.

In various embodiments of the present invention each workstation (361, 362) has a PC with a video display, such as PC/VDU 331 at workstation 361 and PC/VDU 332 at workstation 362. There will be in most architectures many more than the two telephone workstations shown, each with an associated PC, but two are considered adequate by the inventors to illustrate embodiments of the present invention.

PC/VDUs 331 and 332 in various embodiments are connected on a local area network (LAN) 301 which also connects to a data file server 303 and to processor 223 running an instance of T-Server 207. The arrangement of PC/VDU plus telephone at each workstation is a common arrangement for many company facilities, and has become more common as more and more people become computer literate. Moreover, many companies are actively training employees in use of computers, and providing PC-type computer equipment, usually interconnected by company LAN, for employees to use.

In the exemplary system shown, calls may originate at any remote call-in point, which is represented in FIG. 1 by region 100, referred to herein as the network cloud. Network cloud 100 may be a small regional portion of the world-wide network of connected telephony equipment, or may represent the entire world-wide network. An incoming call at any point in network cloud 100 is represented by vector 107 to service control point (SCP) 101 (typically a router in the network cloud), which in this example is connected to an adjunct processor 103 and coupled thereby to an intelligent peripheral (I-P) 102, a distribution processor 104 and a processor 208 running a second instance of unique T-Server 207 as well as a statistical server (stat-server) 209. In this system calls are forwarded to switch 121 at the customer premises equipment over telephone line 105, and associated data is forwarded in parallel to processor 223 over a digital network link 210. Such systems, wherein data associated with a call is forwarded on a separate link from the call itself, are, to the inventor's knowledge at the time of the present patent application, not known in the art, but are known to the inventor. This feature, however, is not required in practice of the present invention, but preferred in some embodiments.

In embodiments of the present invention a call originating in the network cloud and routed to switch 121, destined for one of telephones 131 or 132 or to another destination at the customer's premises, typically carries a destination number, which may include a direct inward dialing (DID) feature, whereby a limited number of lines may be used to carry calls to a larger number of final destinations, accomplished principally by software techniques. Destination may also be to a virtual number, of which many may be programmed, and T-Server 207 may be adapted to further route calls forwarded to such virtual numbers. The phone call may also have caller ID attached (originating caller's phone number), and in those cases wherein a separate network digital data link is accomplished between processors at the origination end (208) and the customer's premises (223) cases a data packet associated with the call may be forwarded over link 210. Also, T-S 207, which interacts continuously with switch 121 in this embodiment, is capable of transacting with data file server 303, given caller ID and/or other data associated with a call, to retrieve further information about the caller from data file server 303.

It will be apparent to those with skill in the art that incoming calls are not limited to two telephones as shown in FIG. 1. There may be many more than two telephones connected to switch 121, other telephony equipment, such as facsimile equipment and data lines may also be connected and involved in routing decisions and transactions according to embodiments of the present invention. Moreover, existing techniques, such as virtual expansion for routing calls with a certain number to multiple destinations on some pre-programmed protocol may also be involved. The simple diagram of a switch with two telephones connected is meant to be illustrative for description of embodiments of the present invention.

It will be apparent to those with skill in the art as well, that a separate processor shown as processor 223 in FIG. 1, is not strictly required in embodiments of the invention, depending on the level of machine intelligence and sophistication of switch 121. Switches for customer premises continue to be developed with new levels of intelligent capability, and some may be capable of interacting with other elements of the present invention without a separate processor between the switch and a LAN such as LAN 301. Processor 223 will be required to practice various embodiments of the invention with many existing telephony switches which may be used as element 121. In virtually all cases in practicing the present invention, an instance of unique T-Server 207 executing on a computerized platform will be required.

In a preferred embodiment of the present invention routing intelligence is no longer confined to a central location such as telephony switch 121 or T-Server 207 running on a connected processor, but distributed in a manner that individual users of the system may customize routing at their own workstations, using individual PCs. This is accomplished in large part by control code executable at a user's computer workstation. It is not required that the actual code be always at the user's workstation, as it may be shared code resident at, for example a file server on LAN 301, such as file server 303. The unique code may be accessed from such a server and executed at any one of several workstations such as workstations 361 and 362 by PC/VDU 331 and PC/VDU 332 respectively. The location of stored code, and access to such code is not, however germane to the invention. In embodiments of the invention, an individual PC executes unique code to provide call-routing control for an individual.

In embodiments of the present invention, T-Server 207 is adapted to cooperate with code executed at individual PCs to route incoming calls. In this unique routing process there are at least two different mechanisms that may be used. In one mechanism, all calls are routed to a single routing point, and each individual routing application registers with that routing point. In this case a record of each call is broadcast on LAN 301, as will be described more fully below, and filtering occurs at each PC router. In a second mechanism there may be a virtual routing point for each PC using a personal router on the LAN. In this second case there is no need to broadcast call particulars on the LAN. This second alternative is typically more expensive than the first, and there are currently rather severe limitations on how many automatic call distribution (ACD) queues or routing points may be allocated on a typical central switch.

Figure 2:
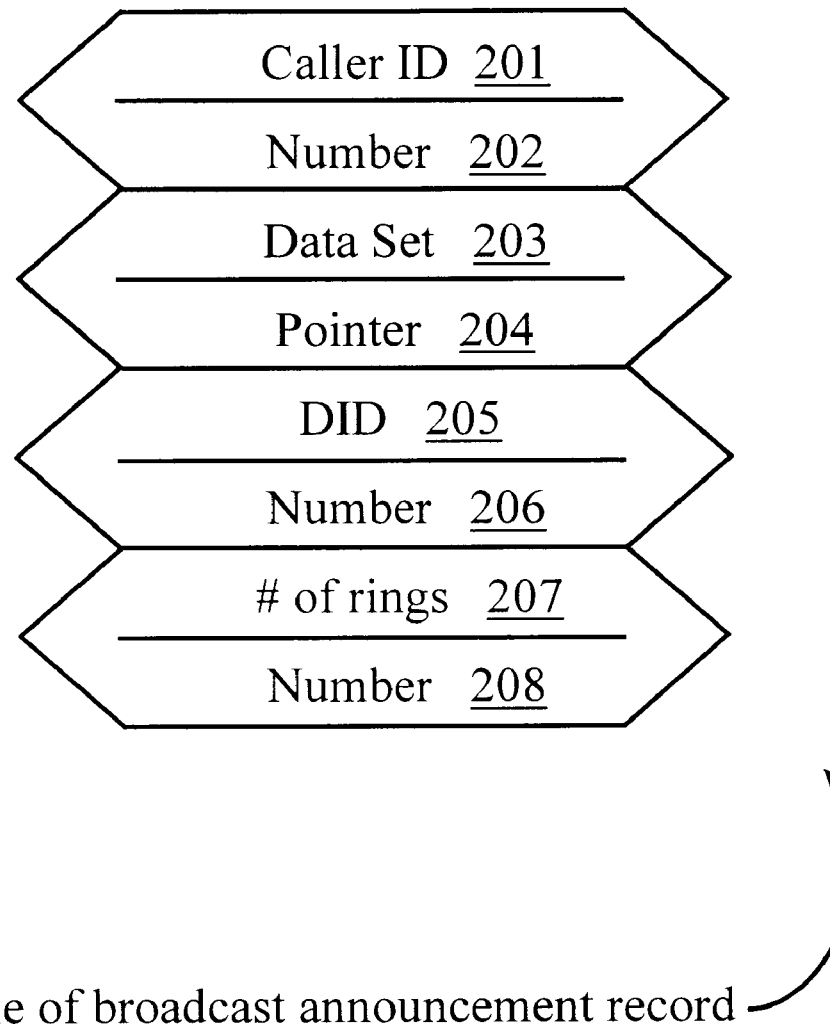
FIG. 2 is a sample of a broadcast announcement record in an embodiment of the present invention.

Referring now to FIG. 2, and presuming the first of the two mechanisms described immediately above, with each incoming call, an overall record of the call, prior to routing, is broadcast on LAN 301. This overall record can take a number of different forms, of which the example in FIG. 2 is just one exemplary form. In this example the overall record consists of four data portions. One data portion consists of elements 201 and 202. Data element 201 identifies this portion as the caller ID associated with the incoming call, and element 202 is the caller ID number. A second data portion consists of data elements 203 and 204. This portion is a data set which may be transmitted via link 210 to processor 223 in parallel with the incoming call, or may be composed partly of data retrieved from server 303, using other call data as a pointer. Element 203 identifies the data as a data set, and element 204 is the pointer. Similarly elements 205 and 206 constitute a direct inward dialing (DID) number, and elements 207 and 208 fix number of rings.

A central element in the present invention is that a user at an individual PC runs an instance of a personal router application, providing that user with instant and complete control over routing of calls meant for that user (or, in some cases, associated users). The user's PC, such as PC/VDU 331 is connected typically by LAN to a processor such as processor 223, in turn connected to the central switch, such as switch 121.

At the computer portion of an individual workstation, such as PC/VDU 331 at workstation 361, the user has access to the local application which is interactive with code executed at T-Server 207 at processor 223, to control and customize routing for incoming calls, depending on certain data elements in the broadcast announcement record (FIG. 2). As a part of this unique capability to program routing responses, the individual user may in some embodiments load to his/her VDU a unique user interface, an example of which is shown in FIG. 3.

Figure 3:
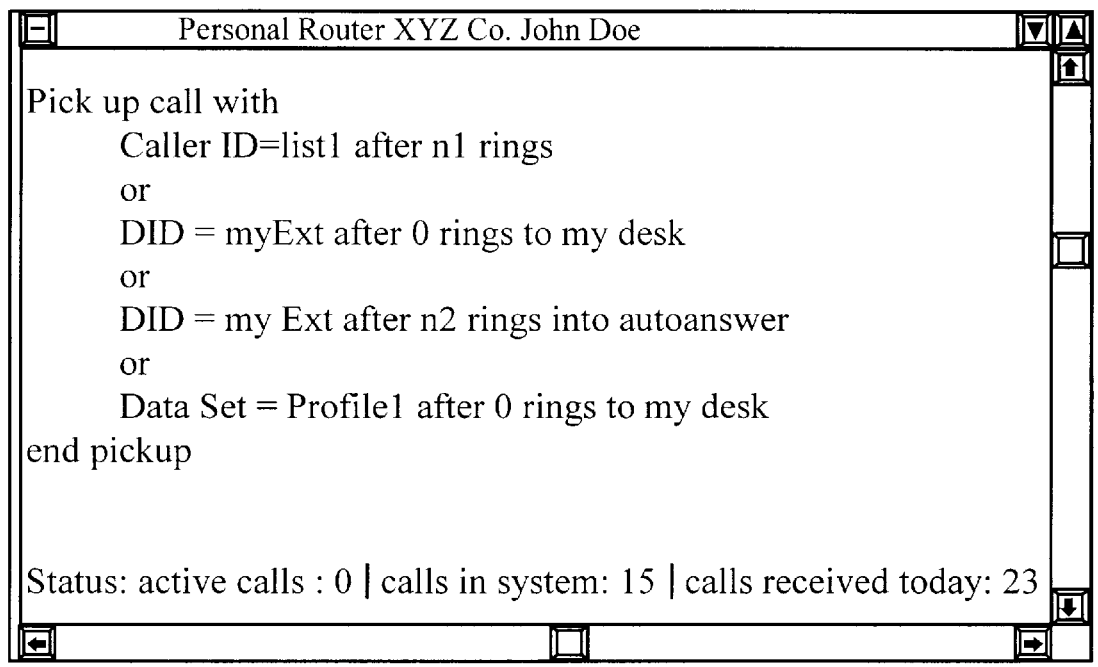
FIG. 3 is a sample user interface screen in an embodiment of the present invention.

FIG. 3 illustrates a window presentable to a user at an individual workstation, compatible, for example, with Windows operating systems. This is an input and display interface for a personal router, a variation of which may be assigned to each of selected employees to provide these individuals with an ability in conjunction with the premises telephone equipment to customize and periodically adjust the routing of certain incoming calls. In this example, the interface is for company XYZ and limited to employee John Doe.

Through the individual interface, John Doe in this instance, may program in a relatively high-level language, routing preferences for certain incoming calls, according to data broadcast for such calls on LAN 301. In the case where each user has a dedicated routing point, an incoming call is directed to the individual's computer, and the broadcast is not necessary.

In this example John Doe has programmed his interface to pick up all calls having Caller ID matched with a list "list1" after n1 rings. List1 is resident in John Doe's database associated with his own Personal Router, and John Doe may call up this list and amend, delete, and expand it as he wishes. The number of rings n1 may be any convenient number to accomplish John's purpose.

John Doe may program negative lists as well. Although not specifically recommended, a negative list could be used to hang up on all calls that have an ID associated with a company or individual that has been making harassing calls to an employee, or to shunt such calls to a special tracking program or the like.

John Doe in this instance has also programmed his personal router to send all calls bearing his assigned DID number to the telephone at his desk after 0 rings, and to an answering machine after n2 rings. Associations with data sets may also be made, comparing such data sets to stored profiles and the like. At the bottom of the display in this example a status summary of calls may be provided. A user may choose to have this window resident on his computer screen as a pix-on-pix, or to hide it and call it as needed. Also, it will be apparent to those with skill in the art that it is not strictly required that each selected person having an associated routing interface assigned have a computer at his/her elbow. For those persons not, for one reason or another, inclined to program their own routing, the interface may be called up and done by another, with appropriate access security applied. A secretary or system administrator may perform such functions, using any workstation connected to company LAN 301.

The user interface at the user's workstation can take any of a variety of forms, and have a variety of functionality. Typically, when the user logs on, his system will be configured to execute the unique application to run in the background, and to monitor for incoming calls at all times the user is present and active. It will be apparent to those with skill in the art that this can be done in a variety of ways. The interface, for example, may be a Graphic User Interface (GUI) wherein icons may be used to represent calls, callers, and other users, and the individual user at one workstation may select to display icons as desired. In this alternative embodiment an incoming call may appear on a user's PC VDU as a small telephone in an announcement bar. Such announcement bars are familiar to those with skill in the art, such as seen on Operating System Desktops, where an e-mail arrival may be indicated by a letter icon and a sound.

In such an embodiment, by moving the screen cursor to the telephone icon, which may be programmed to "ring" or to vibrate as though it is ringing, the user may activate a text balloon announcing the caller ID or other call data, or such data may be displayed directly in the icon. The system can be configured in such an embodiment to allow the user to route the call to his own phone with a click, to hang up with a double click, to drag the call to a holding queue (represented by a basket, for example,) to send the call to an answering machine, which may be done by dragging and dropping the telephone icon to an answering machine icon, to transfer the call to another person by dragging and dropping the telephone icon to an icon representing another user (such as the instant user's secretary or supervisor for example). Those with skill in the art will recognize that the functionality through the use of click and drag-and-drop procedures is very broad indeed.

Actions taken at the personal router interface at an individual PC on LAN 301 in embodiments of the present invention are codified as instructions on the LAN to T-Server 207 (in most cases) running on a processor such as processor 223, connected to central switch 121. If an individual user at a workstation, for example, has received an indicator of a waiting call, and has dragged the ringing telephone to his secretary's desk icon in his interface, his personal router interacts with T-Server 207 to instruct switch 121 to reroute the call to the secretary's telephone. In a similar manner, most actions at a personal router become instructions to switch 121, and in general each user having access to such a personal router can program responses to calls and respond to incoming calls in real time with a broad set of available responses.

In embodiments of the invention, not necessarily all calls are routed by personal routers executed on PCs on LAN 301. There may also be overriding routing rules programmed into switch 121, such that certain calls or types of calls are always handled in a certain way. Rules in switch 121 may also determine the fate of calls that are not eventually routed by personal routers. For example, all calls alive after seven rings may be switched to a recorded announcement, and the like. In this manner a very broad freedom of routing may be accomplished, with security and flexibility to adapt for changes in the organization.

It will be apparent to those with skill in the art that the division of code and functionality between server 303, T-Server 207 running on processor 223, and individual workstations on the LAN is somewhat arbitrary, with the requirement that individuals at the workstations have interface access to customize and update personal routing rules.

In another aspect of the present invention a Personal Desktop Router is implemented in a Client-Server architecture. This embodiment is illustrated with the aid of FIG. 4. In this embodiment a router 401 is provided and executes on processor 223 which also executes an instance of T-Server 207. Router 401 in this instance is a central router having routing rules divided in sections dedicated to each assigned user or DN on LAN 301. Unique Client Interface Packages represented by elements 401a and 401b are provided at individual workstations such as workstation 361 and workstation 362 connected to LAN 301. Client Interface Packages 401a and 401b are for the purpose of allowing users at the workstations to edit their own personal routing rules, much as has been described above for personal routers according to embodiments of the present invention, wherein the routers execute at the workstations.

In this Client-Server embodiment of the present invention, the actual router software exists and executes as one router 401. Client Packages 410a and 410b may be implemented as a Graphical User Interface (GUI) with iconic drag and drop features as described above with reference to FIG. 1, or may be of another suitable type designed to allow interaction with router 401.

It will be apparent to one with skill in the art that router 401, in this embodiment, is not required to reside in processor 223, but may reside in any other machine capable of executing the router and connected or coupled to LAN 301, such as switch 121. It will also be apparent to one with skill in the art that while router function does not occur at individual workstations 361 and 362 in this particular embodiment, editing capabilities provided to the user via client packages 401a and 401b can remain essentially the same as described in previous embodiments taught herein.

In typical embodiments, router 401 is configured to allow a group manager or system agent to perform higher level configurations to routing rules, such as type of calls available, call parameters, user function or location changes, etc., while individual users may, through their interfaces, configure routing rules for their own calls, within the boundaries set by the supervisor.

It will be apparent to one with skill in the art that any configurational division of editing capabilities may be employed with reference to routing rules as they may exist in any given application without departing from the spirit and scope of the present invention. A server-based router such as router 401 in this embodiment, wherein a unique client package is provided for editing purposes at a user's workstation, such as workstation 361, is heretofore unknown to the inventor.

Figure 4:
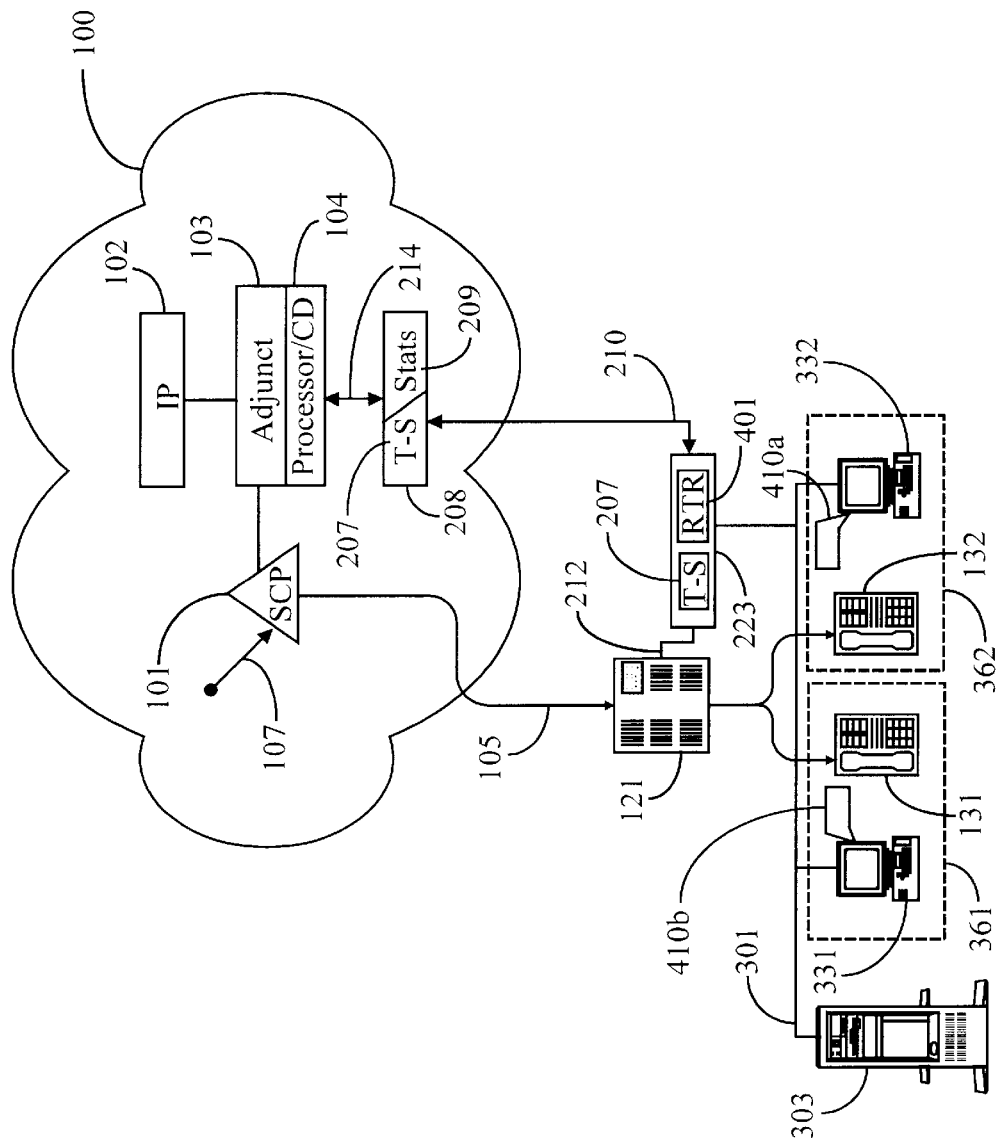
FIG. 4 is a system diagram of a call-routing system implemented in client-server mode in an embodiment of the present invention.

In the embodiment illustrated by FIG. 4 communication over analog lines 105 and data link 210, and other functions of the system, is essentially the same in method as is illustrated in FIG. 1 and described above with reference to FIG. 1. Also, network cloud 100 and the components therein are essentially the same as in the embodiment in FIG. 1. For this reason much detail as to the dynamics of and paths of communication in an embodiment of the present invention with respect to FIG. 4 are not repeated here.

In another aspect of the invention routers at different levels, including, for example, a central router in the network cloud, such as at an SCP, routers at switch level, such as at a CTI-enhanced call center, and routers at a personal level, such as the personal routers disclosed in the present specification, whether executing entirely on personal computer stations or in a client-server mode, may negotiate routing between them.

In embodiments exhibiting this negotiating aspect, routers at different system levels are adapted to negotiate. For example, at a call center wherein personal routers are in use, and individual users can set and alter their own routing rules, it is quite possible that two or more persons may have set their personal routing rules in a manner that there will be contention for an incoming call. As one of many possible examples, one agent in a call center may have set routing rules to receive all calls from Spanish-speaking clients, and another agent may have set rules to handle all calls from senior citizens. A call from a senior citizen whose first language is Spanish is not clearly intended for one agent over the other, and negotiation is necessary.

Negotiation in this case may be between the two personal routers, or between each of the personal routers and a switch-level router. Negotiating rules can be set in a wide variety of ways to arbitrate such overlap and dispute. Preference may be given, for example, based on busy status, load patterns, time-of-day, and many other criteria, and criteria can be weighted. In embodiments based on this negotiation aspect of the invention, the arbitration process ultimately routes the calls.

In some embodiments central routers, such as at the SCP level, are eliminated altogether in the conventional sense that the SCP arbitrarily establishes routing based on available information. In such a system the SCP forwards requests based on incoming calls to lower-level routers, and calls are routed to switches and ultimately to final destinations based on negotiation and instruction from and at the local level. The SCP in essence broadcasts data based on an incoming call and a request for a destination, and local routers through inter-negotiation, direct the call to or away from their own destinations based on rules and arbitration schemes that, may, in some embodiments, be updated by persons at the final destination level.

It will be apparent to those with skill in the art that there are many alterations that may be made in the embodiments of the invention herein described without departing from the spirit and scope of the invention. Some of these have been described above, such as the use of a telephony server like T-Server 207 running on processor 223. In some cases such a server is not needed to practice the invention, as was described above.

Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A method for determining a destination for an incoming telephone call received in a telephony network having a service control point (SCP) to one of a plurality of workstations each having a telephone and a computer station with a video display unit (PC/VDU) proximate the telephone, the PC/VDUs each connected to the SCP via a wide area network (WAN), the method comprising steps of:

(a) implementing a personal router at each PC/VDU wherein individual users determine personal routing rules for the associated workstation;

(b) sending data pertaining to an incoming telephone call and a request for a destination from the SCP to individual ones of the plurality of workstations via the WAN;

(c) negotiating a final destination for the incoming telephone call among the individual ones of the plurality of personal routers; and (d) sending a response to the SCP via the WAN, the response including a final destination for the telephone call determined as a result of the negotiation.

2. The method of claim 1 comprising a further step for sending the telephone call to the final destination by the SCP directing the network where to send the call as a result of the response in step (d).

3. The method of claim 1 wherein, in the plurality of workstations, groups of workstations are organized in call centers, each call center having a telephony switch to which individual telephones are connected with PC/VDUs proximate the telephones, and wherein the PC/VDUs are interconnected via a local area network, a processor also connected on the local area network providing connection to the SCP via the WAN, and wherein, in step (b) data pertaining to a telephone call and a request for a destination is sent to individual personal routers via the WAN and the LAN, and in step (c) negotiation is via the LAN and the WAN.

4. The method of claim 3 wherein personal routers are executed on a server connected to the LAN in a client-server relationship with the workstations.

5. The method of claim 4 wherein the client-server router executes on the telephony switch.

6. The method of claim 4 wherein the client-server router executes on a processor connected to the telephony switch by a CTI connection, and the processor is connected to the LAN.

7. A telephone call distribution system for determining destination for an incoming telephone call in a telephony network including a service control point (SCP), comprising:

a plurality of workstations each comprising a telephone coupled to the telephony network and a proximate computer station having a video display unit (PC/VDU), the PC/VDU connected to the SCP via a wide area network (WAN); and a personal router associated with each PC/VDU wherein individual users determine personal routing rules for the associated workstation;

wherein the SCP broadcasts data pertaining to the incoming telephone call and a request for a destination to individual ones of the PC/VDUs via the WAN, and the personal routers negotiate a destination based on the individual routing rules and the data pertaining to the call, and at least one of the individual routers responds to the SCP with a destination for the call.

8. The system of claim 7 wherein the SCP directs the incoming telephone call to the destination returned by at least one of the personal routers.

9. The system of claim 7 wherein, in the plurality of workstations, groups of workstations are organized in call centers, each call center having a telephony switch to which individual telephones are connected with the PC/VDUs proximate the telephones, and wherein the PC/VDUs are interconnected via a local area network, a processor also connected on the local area network providing connection to the SCP via the WAN.

10. The system of claim 9 wherein personal routers are executed on a server connected to the LAN in a client-server relationship with the workstations.

11. The system of claim 9 wherein the client-server router executes on the telephony switch.

12. The system of claim 9 wherein the client-server router executes on a processor connected to the telephony switch by a CTI connection, and the processor is connected to the LAN.

* * * * *

UNITED STATES PATENT AND TRADEMARK OFFICE
CERTIFICATE OF CORRECTION

| | | |
|---|---|---|
| PATENT NO. | : 6,005,931 | Page 1 of 1 |
| APPLICATION NO. | : 08/968825 | |
| DATED | : December 21, 1999 | |
| INVENTOR(S) | : Igor Neyman et al. | |

It is certified that error appears in the above-identified patent and that said Letters Patent is hereby corrected as shown below:

On the Title Page:

Item [63]　　　　　　　　　Delete "Jun. 5, 1997"
　　　　　　　　　　　　　　Insert -- Jun. 4, 1997 --

In the Specification:

Column 1, lines 8-9　　　　Delete "Jun. 5, 1997,"
　　　　　　　　　　　　　　Insert -- Jun. 4, 1997, which --

Signed and Sealed this
Seventeenth Day of March, 2015

Michelle K. Lee
*Director of the United States Patent and Trademark Office*